United States Patent Office 2,822,406
Patented Feb. 4, 1958

2,822,406

PRODUCTION OF ALKYL PHENOLS BY FUSION

George C. Feighner, Ponca City, Okla., assignor to Continental Oil Company, Ponca City, Okla., a corporation of Delaware No Drawing. Application October 5, 1955
Serial No. 538,776

1 Claim. (Cl. 260—628)

This invention relates to the production of alkyl phenols by a process involving the sulfonation of alkaryl hydrocarbons and the fusion of the resulting sulfonate with sodium hydroxide.

Methods for the production of phenol from benzene wherein the benzene is first sulfonated and then the resulting sulfonate is fused with sodium hydroxide are well known, consequently a further description of these methods is unnecessary. It would be expected that since sodium hydroxide may be used satisfactorily in the fusion of benzene sulfonic acid it could be used also with equal satisfaction in fusion processes involving an alkyl substituted benzene sulfonic acid. Such is not the case. When an alkaryl sulfonate is fused with sodium hydroxide the reaction mixture, following the prior art methods, becomes dough-like and agitation is difficult, if not impossible. At this point the reaction appears to stop even upon continued heating until a certain point is reached at which time the reaction proceeds with explosive violence. Various methods have been proposed in an attempt to avoid these difficulties. The use of potassium hydroxide has been proposed and such a procedure gives satisfactory results as far as the mechanics of the process is concerned. Potassium hydroxide, however, is far too expensive and difficult to obtain and for these reasons is not used in industry. In another method it has been proposed to use a mixture of potassium and sodium hydroxides as the fusion mass. This latter method was suggested in "Organic Syntheses" (collective volume I, Henry Gilman, editor-in-chief, New York, John Wiley and Sons, Inc., 1932, page 169) wherein it is stated:

"Fusion with sodium hydroxide alone yields no cresol, the fused sodium hydroxide appearing to have no solvent action on the sodium p-toluenesulfonate. On the other hand, potassium hydroxide works entirely satisfactorily, as do mixtures of sodium hydroxide and potassium hydroxide containing not less than 28 percent of potassium hydroxide."

Although this method is an improvement over methods employing pure potassium hydroxide as a fusion mass, a certain amount of potassium hydroxide must be used. It has also been proposed that the difficulties due to the formation of a dough-like mixture during the fusion process may be eliminated by including a low molecular weight sulfonate such as sodium benzene sulfonate in the fusion mixture. Although such a method does eliminate the formation of dough-like mixtures and the attendant difficulties, a mixture of phenols is obtained. In many cases it is very difficult to separate the mixture of phenols obtained by this process into the individual phenols. In all cases such a method introduces an additional and expensive separation step in the process.

It is, therefore, a principal object of the present invention to provide a process for the production of alkyl phenols which method obviates the disadvantages of the prior art processes. It is another object of my invention to provide a process which will give fluid reaction mixtures and eliminate the formation of difficulty agitated dough-like masses that may react with explosive violence. It is yet another object of this invention to provide a practical and economical method for the production of an alkyl phenol by the fusion of an alkaryl sulfonate with sodium hydroxide under conditions such that a smooth reaction results and the yields are good. It is a further object of my invention to provide a method for the production of alkyl phenols in a relatively pure form. These and other objects of this invention will appear as the description proceeds.

To the accomplishment of the foregoing and related ends, this invention then comprises the features hereinafter fully described and particularly pointed out in the claim, the following description setting forth in detail certain illustrative embodiments of the invention, these being indicative, however, of but a few of the various uses in which the principle of the invention may be employed.

Broadly stated, the alkyl phenol may be prepared by slowly adding an alkaryl sulfonic acid or the corresponding sulfonate to a fused mass of sodium hydroxide. An alkaryl sulfonic acid of the sulfonate are equivalent in the process of my invention. This is true because if a sulfonic acid is added to fused sodium hydroxide, sodium sulfonate is first formed, which is then converted to the phenate. Upon completion of the reaction between the sulfonate and the sodium hydroxide the mixture is acidified, thus converting the sodium alkyl phenate to the corresponding alkyl phenol.

I have found that good yields of alkyl phenols can be produced by a process involving the fusion of alkaryl sulfonic acids or sulfonates using molten sodium hydroxide provided the two conditions listed below are complied with:

(1) The molten sodium hydroxide must be maintained at a temperature within a range of about 340 to 450° C., or stated alternatively and somewhat preferably, the temperature of the sodium hydroxide should be maintained at a temperature above the melting point of the crude sodium alkyl phenate mixture formed in the reaction, (2) The concentration of the unreacted sulfonate or sulfonic acid present in the reaction mixture is not allowed to exceed the percentage figures given below.

I have found that as the reaction proceeds the amount of unreacted sulfonic acid or sulfonate that can be tolerated in the reaction mixture continuously increases from about 1.5 percent when the reaction is initiated to 10 percent near the end of the reaction. For best results, I prefer to maintain the concentration of unreacted sulfonic acid or sulfonate in the reaction mixture during the initial portion of the reaction below 1.0 percent. All percent figures are weight percent based on the total weight of the mixture. If the concentration of the unreacted sulfonic acid or sulfonate present in the mixture exceeds the foregoing values the resulting mixture becomes dough-like, agitation is very difficult and, as mentioned above, continued heating of the mixture results in no apparent reaction until it finally proceeds with explosive violence.

Before proceeding with specific examples illustrating my invention, it may be well to indicate in general the nature of the materials required in the process.

Suitable sulfonates are those prepared from various aromatic petroleum fractions or from sulfonates of the normal and branched chain alkaryl hydrocarbons containing 4–21 carbon atoms in the side chain obtained by the reaction of an excess of an aromatic hydrocarbon with an alkylating agent in the presence of an alkylation catalyst. Specific aromatic hydrocarbons that may be used include benzene, toluene, xylene, cumene, and similar aromatic hydrocarbons. Suitable alkylating agents include straight or branched chain olefins, alcohols, or halides having from 3 to 30 carbon atoms. Olefins that may be used are those that are obtained by the cracking of hydrocarbons such as wax, kerosene, or other petroleum hydrocarbons or may be obtained by the polymerization of a low molecular weight olefin such as ethylene, propylene, and mixtures thereof, or may be obtained by the reaction of carbon monoxide and hydrogen in the presence of a catalyst. The alkaryl sulfonate that may be used in this process may be the crude or purified sulfonic acid obtained by the sulfonation of an alkaryl hydrocarbon or it may be the crude or purified inorganic salt of the sulfonic acid and a basic compound such as the alkali or alkaline earth metal hydroxides, oxides, or carbonates. For economical reasons and because of its availability, I prefer sodium sulfonate. Also because of its availability, I prefer to use the sulfonate which is obtained by the sulfonation and subsequent neutralization with sodium hydroxide of the product known as H-160. This product is available commercially from Continental Oil Company, and it is a co-product obtained in the production of dodecylbenzene by the alkylation of benzene with dodecene. Typical characteristics of H-160 are as follows:

| | |
|---|---|
| Percent aromatics | 55 |
| Average molecular weight: | |
| Total product | 157 |
| Aromatics | 149 |
| Paraffins | 163 |
| A. P. I. gravity at 60° F | 41.2 |
| Aniline point (° F.) | 95 |
| Flash point (closed cup) ° F | 129.5 |
| A. S. T. M. distillation: ° F | 290 |
| 5% | 344 |
| 10% | 355 |
| 20% | 367 |
| 30% | 375 |
| 40% | 380 |
| 50% | 390 |
| 60% | 390 |
| 70% | 405 |
| 80% | 417 |
| 90% | 438 |
| 95% | 454 |
| E. P | 482 |
| Rec | 99 |

The alkyl aromatic hydrocarbons in H-160 are tertiary alkyl substituted benzenes wherein the number of carbon atoms in the alkyl group varies from 4 to 9.

Another product useful in my invention is H-340 sulfonic acid, obtained by the sulfonation of an alkaryl hydrocarbon known as H-340 also available commercially from Continental Oil Company. Characteristics of H-340 are as follows:

| | |
|---|---|
| Specific gravity at 48° C | 0.866 |
| Average molecular weight | 300 |
| A. S. T. M., .D-158 Engler: | |
| I. B. P ° F | 617 |
| 5 ° F | 625 |
| 10 ° F | 630 |
| 50 ° F | 656 |
| 90 ° F | 710 |
| 95 ° F | 730 |
| F. B. P ° F | 738 |
| Refractive index | 1.4902 |
| Viscosity at 100° F., SUS | 110 |
| Bromine number | .40 |

The alkyl aromatic hydrocarbons in H-340 are tertiary alkyl substituted benzenes wherein the number of carbon atoms in the alkyl group varies from 12 to 20.

Yet another product useful in my invention is Neolene sulfonic acid obtained by the sulfonation of a blend of monoalkylbenzenes, sometimes called dodecylbenzene, also obtainable commercially from Continental Oil Company under the trade name Neolene 400. Characteristics of Neolene 400 are as follows:

| | |
|---|---|
| Specific gravity at 16° C | 0.8742 |
| Average molecular weight | 232 |
| A. S. T. M., .D-158 Engler: | |
| I. B. P ° F | 535 |
| 5 ° F | 545 |
| 10 ° F | 550 |
| 50 ° F | 560 |
| 90 ° F | 580 |
| 97 ° F | 592 |
| F. B. P ° F | 603 |
| Refractive index at 20° C | 1.4885 |
| Viscosity at 20° C centipoises | 14 |
| Bromine number | 0.16 |

Since the sulfonates and the sulfonic acid used in the process can be selected from a large list, the reaction temperature can accordingly be varied over a wide range. Suitable and preferred temperatures vary from 340 to 450° C., and 350 to 425° C., respectively. For most sulfonates and sulfonic acids, I prefer to operate over a somewhat more limited temperature range, such as 350 to 370° C.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

*Example 1*

A reactor equipped with heating mantle, agitator, and thermometer was charged with 1,680 parts of technical sodium hydroxide flakes. The sodium hydroxide was heated to 360° C. under a blanket of nitrogen and while stirring at 50 R. P. M. and maintaining the temperature at 360 to 370° C., 9,430 parts of aqueous sodium sulfonate of H-160 analyzing 15.55 percent sodium sulfate and 40 percent sodium sulfonate of H-160 was added during 85 minutes. At the end of the addition, the reaction mixture was agitated at 343 to 363° C. for 105 minutes and then allowed to cool overnight. There was obtained 6,221 parts of crude product which was dissolved in 1,000 parts of hot water (50° C.) and acidified with hydrochloric acid, requiring 760 parts to give a pH of 9. The mixture was then extracted with 2,000 parts and 1,000 parts of benzene. The combined benzene extracts were washed with 10 percent aqueous sodium bicarbonate and after stripping out the benzene, the product was distilled at a pressure of 5 mm. and the following fractions were obtained:

| Fraction | Boiling Point at 5 mm. ° C. | Parts | °C. Melting Point | Refractive Index, $n_D^{30}$ | Percent Hydroxyl | Mol. Wt. |
|---|---|---|---|---|---|---|
| 1 | up to 80 | 4.4 | | 1.5353 | 15.64 | 109 |
| 2 | 80-111 | 201.8 | 50-1 | | 11.95 | 142 |
| 3 | 111-114 | 200.2 | 74-5 | | 10.66 | 159 |
| 4 | 114-119 | 223.9 | 70-1 | | 10.37 | 164 |
| 5 | 119-126 | 199.4 | 57-8 | | 9.89 | 172 |
| 6 | 126-134 | 191.7 | | 1.5154 | 9.02 | 188 |
| 7 | 134-136.5 | 188.3 | | 1.5132 | 8.80 | 193 |
| 8 | 136.5-141 | 205.3 | | 1.5161 | 8.32 | 204 |
| 9 | 141-144 | 197.0 | | 1.5134 | 8.11 | 210 |
| 10 | 144-250 | 164.0 | | 1.5559 | 5.94 | 280 |

If desired, the step wherein the benzene extract is washed with aqueous sodium bicarbonate may be eliminated.

H-160 was sulfonated with either oleum or with sulfur trioxide. Oleum sulfonation was carried out as follows:

To 354 parts of H-160 in a reactor was added during 15 minutes while maintaining the temperature below 70° C. 268 parts of 24.2 percent oleum. The mixture was then vigorously agitated and maintained at 70° C. for 1.5 hours. The mixture was then cooled to ambient temperature and allowed to stand quiescent, whereon a paraffin layer of 145.5 parts was separated. To the acid layer of 474.5 parts was added 50.8 parts of crushed ice. After standing, a spent acid layer of 136.5 parts analyzing 72.2 percent sulfuric acid was separated, leaving 390.5 parts of H-160 sulfonic acid having an acidity of 5.98 meq./q. On neutralization with 1.18 parts of 25.5 percent sodium hydroxide per part of acid, sodium sulfonate of H-160 analyzing 35.5 percent sodium sulfonate of H-160, 9.6 percent sodium sulfate, and 54.4 percent water was obtained.

Sulfonation of H-160 with sulfur trioxide was carried out in accordance with the process described in patent application, Serial No. 396,822, filed December 8, 1953, entitled "Method of Sulfonating Alky Aromatic Hydrocarbons," by H. E. Luntz and D. O. Popovac, now U. S. Patent 2,768,199. In brief, the process described in the co-pending application describes a process for the production of an alkaryl sulfonate utilizing an especially designed Votator comprising a rotatable shaft fitted with scrapers within a jacketed elongated cylinder. In operation the scrapers remove that portion of the reaction mixture present on the inner or heat exchange surfaces of the Votator thus making way for an additional quantity of the mixture to come in contact with the heat exchange surface for cooling. The inlets for the sulfonating agent (sulfur trioxide plus an inert gaseous diluent) are so arranged on the Votator shaft that the sulfonating agent is added to the reaction mixture at a multiplicity of points and just ahead of the scrapers. The addition of the sulfonating agent at a multiplicity of points is very desirable as such a procedure minimizes the presence of excess sulfonating agent at any one point in the reaction vessel thus eliminating localized hot spots. Thus, 50 parts per hour of H-160 was sulfonated at a temperature of 130–140° F. with 15.25 parts per hour of sulfur trioxide diluted with 17 volumes of air per volume of sulfur trioxide. There was obtained 21.4 parts of paraffins per hour and 43 parts of H-160 sulfonic acid per hour having an acidity of 4.4 meq./g. On neutralizing with aqueous sodium hydroxide, sodium sulfonate of H-160 analyzing 42.8 percent actives, 2.9 percent sodium sulfate, and 54.3 percent water was obtained.

Example 2

A fusion pot equipped with an anchor agitator was charged with 1,106 parts of 50 percent sodium hydroxide and heated to 360° C. The agitator was rotated at 15 R. P. M. after the temperature had reached 315° C. When the temperature of the caustic was at 360° C., 1,015 parts of sulfonic acid of H-160 prepared in accordance with the process given above by sulfonating H-160 with sulfur trioxide was added at a rate of 150 to 200 parts per hour and the temperature maintained at 360° C. After the addition, the reaction mass was agitated for one hour while maintaining the temperature at 360° C. and blanketing the mass with steam. The fusion mass was then dropped into 2,450 parts of water while vigorously stirring to insure dissolution of the mass. Then, approximately 250 parts of 100 percent sulfuric acid was added cautiously until the mixture had a pH of 7.5. The mixture was allowed to remain quiescent for 8 hours after which the aqueous layer of 3,428 parts containing sodium sulfite was drained off and discarded. There remained about 575 parts of crude H-160 phenols containing about 20 percent water. The crude product was then distilled under reduced pressure yielding 204 parts of solid alkyl phenols, 136 parts of liquid alkyl phenols, and 100 parts of still bottoms.

Example 3

A fusion pot equipped with an anchor agitator was charged with 205 parts of sodium hydroxide and heated to 400° C. There was then added over 1.5 hours 734 parts of sodium p-tertiary butylbenzene sulfonate analyzing 36.5 percent sodium sulfate and 62 percent sulfonate and prepared by the sulfonation of tertiary butylbenzene with 21.4 percent oleum. During the addition, the temperature was maintained at 400 to 425° C. At the end of the addition the mixture was maintained at 400 to 425° C. for an additional hour, then cooled, dissolved in water, neutralized with sulfuric acid, extracted with benzene, and distilled. There was obtained 290 parts of p-tertiary butyl phenol boiling at 236 to 238° C.

Example 4

Example 3 was repeated with the exceptions that 88 parts of sodium para n-octylphenyl sulfonate was added to 31 parts of sodium hydroxide at 360–365° C. There was obtained 28 parts of para-n-octyl phenol.

Example 5

Example 3 was repeated with the exception that 174 parts of sodium p-(1-methylnonyl) benzene sulfonate was added to 56.4 parts of sodium hydroxide at 360 to 365° C. There was obtained 45 parts of p-(1-methylnonyl) phenol.

Example 6

Example 3 was repeated with the exception that 178 parts of sodium p-(1-methylundecyl)benzene sulfonate was added to 52.1 parts of sodium hydroxide at 350 to 360° C. There was obtained 50.5 parts of p-(1-methylundecyl) phenol.

Example 7

Example 2 was repeated with the exception that 482 parts of H-340 sulfonic acid was added during 4¾ hours to 100 parts of sodium hydroxide at 360° C. There was obtained about 200 parts of alkyl phenols.

Example 8

Example 2 was repeated with the exception that 363 parts of Neolene sulfonic acid was added during 4 hours to 148 parts of sodium hydroxide at 355 to 365° C. There was obtained 180 parts of dodecyl phenol.

Example 9

In this example, H-160 sulfonic acid was fused with sodium hydroxide, using the procedure and equipment described in Example 2 with the exception that the sulfonic acid was added to the fused mass at varying rates so as to build up the concentration of the unreacted sulfonate in the reaction mass to different values. The experiments together with the results are summarized below:

| Run No. | Reaction Period | Percent Unreacted Sulfonate in Mixture | Temp., °C. | Condition of Reaction Mixture |
|---|---|---|---|---|
| 1 | Initial | 1.0 | 365 | Fluid. |
| 2 | do | 2.5 | 365 | Dough-like. |
| 3 | 25% Complete | 1.5 | 369 | Fluid. |
| 4 | do | 3.0 | 364 | Dough-like. |
| 5 | 50% Complete | 3.0 | 347 | Fluid. |
| 6 | do | 5.0 | 350 | Dough-like. |
| 7 | 75% Complete | 5.0 | 358 | Fluid. |
| 8 | do | 6.8 | 365 | Dough-like. |
| 9 | 95% Complete | 8.0 | 378 | Fluid. |

In the foregoing table the column headed "Reaction period" refers to the extent of the reaction between the organic compound and the sodium hydroxide in the formation of sodium alkyl phenate. All runs were satisfactory where the condition of the reaction mixture is reported as fluid. As pointed out above, the runs where the reaction mixture is reported as dough-like were unsatisfactory.

While particular embodiments of the invention have been described, it will be understood, of course, that the invention is not limited thereto since many modifications may be made, and it is, therefore, contemplated to cover by the appended claim any such modifications as fall within the true spirit and scope of the invention.

The invention having thus been described, what is claimed and desired to be secured by Letters Patent is:

A process for the production of an alkyl phenol which consists essentially of adding an organic compound selected from the group consisting of an alkaryl sulfonic acid and a salt of said sulfonic acid to a molten mass of sodium hydroxide maintained at a temperature within the range of 340 to 450° C., wherein said sulfonic acid is produced by sulfonating an alkaryl hydrocarbon consisting of tertiary alkyl substituted benzenes wherein the number of carbon atoms in the alkyl group varies from 4 to 9 and said alkaryl hydrocarbon has the following properties:

| | |
|---|---|
| Percent aromatics | 55 |
| Average molecular weight: | |
| Total product | 157 |
| Aromatics | 149 |
| Paraffins | 163 |
| A. P. I. gravity at 60° F. | 41.2 |
| Aniline point (° F.) | 95 |
| Flash point (closed cup), ° F | 129.5 |
| A. S. T. M. distillation ° F | 290 |
| 5% | 344 |
| 10% | 355 |
| 20% | 367 |
| 30% | 375 |
| 40% | 380 |
| 50% | 390 |
| 60% | 390 |
| 70% | 405 |
| 80% | 417 |
| 90% | 438 |
| 95% | 454 |
| End point | 482 |
| Percent recovered | 99 | and said organic compound is added to said molten mass of sodium hydroxide at such a rate that the concentration of the unreacted organic compound present in the reaction mixture at 0, 25, 50, 75, and 95 percent completion of the reaction between said organic compound and said molten sodium hydroxide in the formation of sodium alkyl phenate does not exceed 1.5, 2.0, 4.0, 6.0, and 10 weight percent respectively based on the total weight of said reaction mixture, acidifying the sodium alkyl phenate thus formed and recovering the alkyl phenol.

References Cited in the file of this patent

UNITED STATES PATENTS

| | | |
|---|---|---|
| 2,225,564 | Le Maistre et al. | Dec. 17, 1940 |
| 2,240,073 | Jenkins | Apr. 29, 1941 |

FOREIGN PATENTS

| | | |
|---|---|---|
| 417,423 | Great Britain | Oct. 4, 1934 |